US010986314B2

United States Patent
Shim et al.

(10) Patent No.: US 10,986,314 B2
(45) Date of Patent: Apr. 20, 2021

(54) ON SCREEN DISPLAY (OSD) INFORMATION GENERATION CAMERA, OSD INFORMATION SYNTHESIS TERMINAL, AND OSD INFORMATION SHARING SYSTEM INCLUDING THE SAME

(71) Applicant: HANWHA TECHWIN CO., LTD., Seongnam-si (KR)

(72) Inventors: Jung Min Shim, Changwon-si (KR); Sung Bong Cho, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 15/746,219

(22) PCT Filed: Oct. 20, 2016

(86) PCT No.: PCT/KR2016/011810
§ 371 (c)(1),
(2) Date: Jan. 19, 2018

(87) PCT Pub. No.: WO2017/090892
PCT Pub. Date: Jun. 1, 2017

(65) Prior Publication Data
US 2018/0234665 A1 Aug. 16, 2018

(30) Foreign Application Priority Data
Nov. 27, 2015 (KR) .......................... 10-2015-0167143

(51) Int. Cl.
*G08B 13/196* (2006.01)
*G06K 9/00* (2006.01)
*H04N 7/18* (2006.01)

(52) U.S. Cl.
CPC ....... *H04N 7/181* (2013.01); *G08B 13/19663* (2013.01); *G08B 13/19671* (2013.01);
(Continued)

(58) Field of Classification Search
CPC .......... G06K 9/00771; G08B 13/19671; G08B 13/19682; H04N 5/4403; H04N 21/47
See application file for complete search history.

(56) References Cited

U.S. PATENT DOCUMENTS 5,610,664 A * 3/1997 Bobert ............... H04N 5/44513
348/468
5,926,230 A * 7/1999 Niijima ............... H04N 5/44543
725/56
(Continued)

FOREIGN PATENT DOCUMENTS

KR       20130033116 A *  4/2013
KR     1020130033116 A    4/2013
(Continued)

OTHER PUBLICATIONS

International Search Report (PCT/ISA/210), dated Feb. 2, 2017 by International Searching Authority in International Application No. PCT/KR2016/011810.
(Continued)

*Primary Examiner* — Jamie J Atala
*Assistant Examiner* — Michael Robert Cammarata
(74) *Attorney, Agent, or Firm* — Sughrue Mion, PLLC

(57) ABSTRACT

An OSD information generation camera according to an embodiment of the present disclosure includes: an image recorder configured to receive an image signal and generate an image; a controller configured to extract basic information for generating OSD information from the image; an OSD information generator configured to generate the OSD information based on the basic information extracted by the controller; and a communicator configured to individually transmit data of the OSD information and the image to an external destination.

9 Claims, 14 Drawing Sheets

(52) U.S. Cl.
CPC ......... *G08B 13/19682* (2013.01); *H04N 7/18* (2013.01); *H04N 7/183* (2013.01); *G06K 9/00288* (2013.01); *G06K 9/00671* (2013.01); *G06K 9/00771* (2013.01); *G06K 2209/15* (2013.01); *G08B 13/19686* (2013.01); *G08B 13/19691* (2013.01)

(56) References Cited

U.S. PATENT DOCUMENTS

| | | | | |
|---|---|---|---|---|
| 6,331,877 | B1* | 12/2001 | Bennington | H04N 5/44543 348/564 |
| 9,350,914 | B1* | 5/2016 | Kaur | H04N 5/23229 |
| 2002/0042917 | A1* | 4/2002 | Townsend | H04N 5/44 725/41 |
| 2004/0117638 | A1* | 6/2004 | Monroe | G06K 9/00221 713/186 |
| 2006/0114363 | A1* | 6/2006 | Kang | H04N 21/23412 348/838 |
| 2006/0158514 | A1* | 7/2006 | Moreb | H04N 5/77 348/153 |
| 2008/0024610 | A1* | 1/2008 | Konishi | G08B 13/19652 348/159 |
| 2008/0180525 | A1 | 7/2008 | Kanehira et al. | |
| 2009/0027555 | A1* | 1/2009 | Hanko | H04N 5/4401 348/569 |
| 2009/0079823 | A1* | 3/2009 | Bellamy | G08B 13/19656 348/143 |
| 2010/0110183 | A1* | 5/2010 | Bobbitt | G06K 9/3233 348/143 |
| 2011/0040783 | A1* | 2/2011 | Uemichi | G06F 3/0482 707/769 |
| 2012/0062732 | A1* | 3/2012 | Marman | H04N 7/18 348/142 |
| 2012/0075464 | A1* | 3/2012 | Derenne | A61B 5/0013 348/135 |
| 2013/0266181 | A1* | 10/2013 | Brewer | G06K 9/00302 382/103 |
| 2014/0050455 | A1* | 2/2014 | Ni | H04N 9/8227 386/224 |
| 2015/0092052 | A1 | 4/2015 | Shin et al. | |
| 2015/0146004 | A1* | 5/2015 | Kritt | G06K 9/00671 348/159 |
| 2015/0347823 | A1* | 12/2015 | Monnerat | G06F 16/583 382/118 |
| 2016/0098963 | A1* | 4/2016 | Kim | H04N 5/45 345/690 |
| 2016/0191884 | A1* | 6/2016 | Chen | H04N 7/181 386/223 |
| 2016/0261819 | A1* | 9/2016 | Mizushiro | H04N 9/31 |
| 2017/0076571 | A1* | 3/2017 | Borel | G08B 13/19669 |
| 2018/0025175 | A1* | 1/2018 | Kato | H04L 63/0428 713/153 |

FOREIGN PATENT DOCUMENTS

| | | |
|---|---|---|
| KR | 101347871 B1 * | 1/2014 |
| KR | 101347871 B1 | 1/2014 |
| KR | 20140144398 A * | 12/2014 |
| KR | 1020140144398 A | 12/2014 |
| KR | 101543712 B1 | 8/2015 |

OTHER PUBLICATIONS

Communication dated Jun. 21, 2019, issued by the European Patent Office in counterpart European Application No. 16868791.1.

* cited by examiner

ON SCREEN DISPLAY (OSD) INFORMATION GENERATION CAMERA, OSD INFORMATION SYNTHESIS TERMINAL, AND OSD INFORMATION SHARING SYSTEM INCLUDING THE SAME

TECHNICAL FIELD

Apparatuses consistent with exemplary embodiments of the inventive concept relate to an on screen display (OSD) information generation camera, an OSD information synthesis terminal, and an OSD information sharing system including the same, and more particularly, to an OSD information generation camera that obtains an image, autonomously generates OSD information through the image, and individually transmits the image and the OSD information, an OSD information synthesis terminal that receives the image and the OSD information from the OSD information generation camera, and determines whether to synthesize the image and the OSD information based on an authority of a user or an extent to which a screen is split, and an OSD information sharing system that includes the OSD information generation camera and the OSD information synthesis terminal.

BACKGROUND ART

In general, monitoring systems are used in a variety of places such as commercial and residential areas. Such monitoring systems are used for the purpose of crime prevention and security, but have also recently been used for monitoring pets or children indoors in real time. Further, closed circuit television (CCTV) systems, which are used as such monitoring systems the most, include cameras installed at proper locations for obtaining an image of an area desired to be monitored, and a user monitors the image obtained by a camera.

With development of network technologies, such CCTV systems have recently been developed to allow an image obtained by one camera to be shared between and checked by many users at the same time. Further, many users can check the images of the CCTV camera at different places, not just at one place.

However, a conventional CCTV camera has a one-way information delivery structure for simultaneously transmitting the image to the users. Therefore, users who are in different places have to use a separate communication system in order to exchange information with another user while viewing the image.

Further, an information provider has to specify who receives information one by one in order to share information since a user's authorization does not automatically determine whether or not the information is shared. Furthermore, the kind of information sharable is also restricted since a separate communication system is required in sharing the information. Moreover, in situations wherein special information has to be displayed on an image, the image and the information are immediately synthesized, and thus, any user who is viewing the image is allowed to read the information regardless of the user's authorization, thereby causing a problem in ensuring security.

DISCLOSURE

Technical Problem

An aspect of the inventive concept is to provide an OSD information generation camera that obtains an image, autonomously generates OSD information through the image, and individually transmits the image and the OSD information Further, an aspect of the inventive concept is to provide an OSD information synthesis terminal that receives the image and the OSD information from the OSD information generation camera and determines whether or not to synthesize the image and the OSD information based on authority of a user or an extent to which a screen is split.

Further, an aspect of the inventive concept is to provide an OSD information sharing system that includes the OSD information generation camera and the OSD information synthesis terminal.

It should be noted that the aspects of the inventive concept are not limited to the above-mentioned aspects, and other aspects of the present invention will be apparent to those skilled in the art from the following descriptions.

Technical Solution

According to an exemplary embodiment of the inventive concept, there is provided an on screen display (OSD) information generation camera which may include: an image sensor configured to receive an image signal and generate an image therefrom; a controller configured to extract basic information for generating OSD information from the image; an OSD information generator configured to generate the OSD information based on the basic information extracted by the controller; and a communicator configured to separately transmit data of the OSD information and the image to an external device.

According to an exemplary embodiment of the inventive concept, there is provided an OSD information synthesis terminal which may include: a communicator configured to receive an image and first OSD information from an external device; an input unit configured to receive a user's instruction; an OSD information generator configured to generate second OSD information in response to the user's instruction; a synthesizer configured to synthesize the image with the first OSD information according to a predetermined condition; and a monitor configured to display a synthesized image generated by synthesizing the image with the first OSD information.

According to an exemplary embodiment of the inventive concept, there is provided an OSD information sharing system which may include: an OSD information generation camera configured to obtain an image by capturing a specific area, and generate first OSD information with regard to the obtained image; and a plurality of OSD information synthesis terminals connected to the OSD information generation camera, wherein the OSD information generation camera includes: an image sensor configured to receive an image signal and generate the image; a controller configured to extract basic information for generating the first OSD information from the image; a first OSD information generator configured to generate the first OSD information based on the basic information extracted by the controller; and a first communicator configured to separately transmit the first OSD information and the image to an external device, and wherein a first OSD information synthesis terminal among the OSD information synthesis terminals includes: a second communicator configured to separately receive the first OSD information and the image; a synthesizer configured to synthesize the image with the first OSD information according to a predetermined condition; and a monitor configured to display a synthesized image generated by synthesizing the image with the first OSD information.

Other details of the inventive concept are involved in detailed descriptions and the accompanying drawings.

Advantageous Effects

The exemplary embodiments of the inventive concept have at least the following effects.

The OSD information generation camera separately transmits an image and the OSD information, and the OSD information synthesis terminal separately receives the image and the OSD information and synthesizes the image with the OSD information. Therefore, the synthesis of the image and the OSD information may vary depending on authorization of a user, an extent to which a screen is split, or like criteria, thereby strengthening the security of the OSD information.

Further, the image and the OSD information are synthesized in the terminal but not the camera, and thus the image and the OSD information are separately stored and separately loaded and used in the future when only the OSD information is needed or when only the image not synthesized with the OSD information is needed.

Further, a user can personally generate the OSD information, and it is thus possible to exchange information with or communicate with another user without any separate communication system.

Further, a user authorized as an administrator can directly understand personal information about a person of interest from the image since personal information of a person is embedded beforehand in the OSD information.

Further, the privacy mask is applied to an innocent person and thus protects privacy since the OSD information involves the privacy mask data.

Further, it is easy to check a movement frequency of persons within a relevant area since the OSD information involves the heat map data.

Further, it is possible to quickly and clearly check a license number of a vehicle since the OSD information involves the image of the vehicle's license plate.

The effects of the inventive concept are not limited to the above-described effects, and this specification involves additional various effects.

EXEMPLARY EMBODIMENTS

Figure 1:
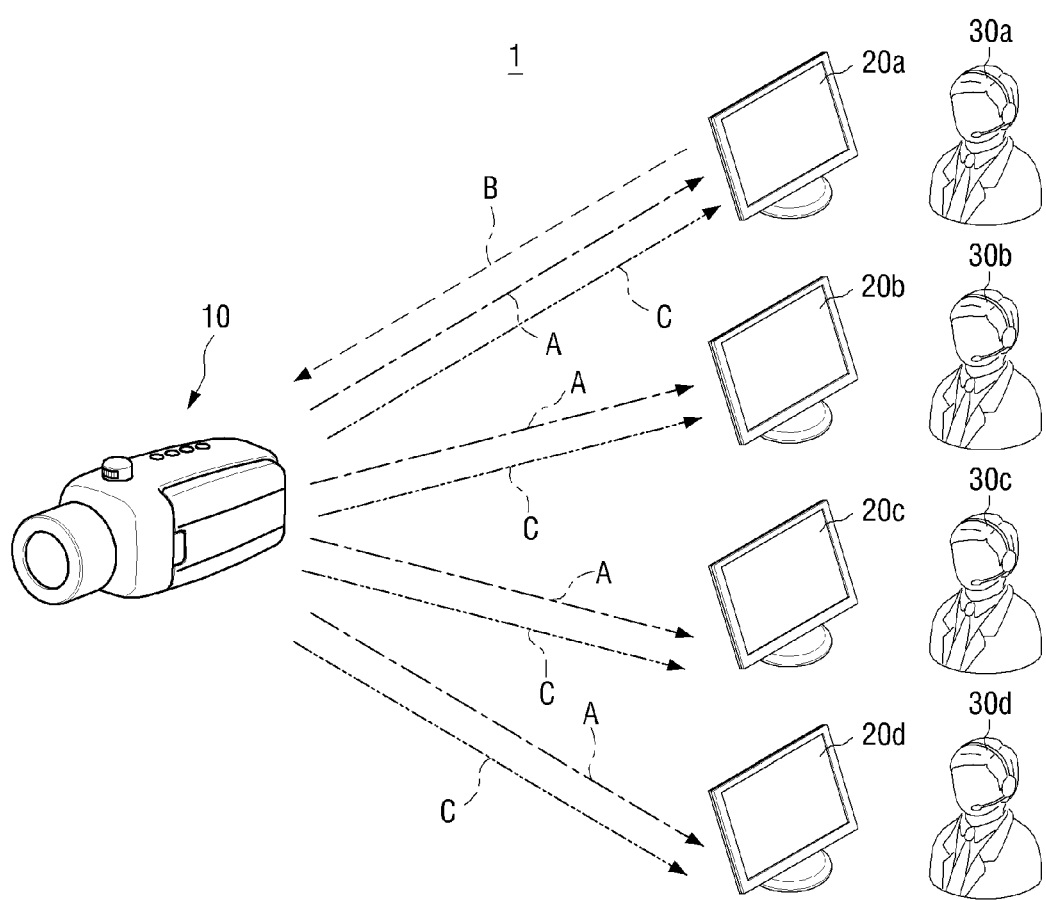
FIG. 1 is a schematic view showing an OSD system 1 according to an embodiment of the inventive concept.

Merits and features of the inventive concept, and a method of implementing the same will now become apparent with reference to the accompanying drawings and the exemplary embodiments described below in detail. The inventive concept may, however, be embodied in many different forms, and should not be construed as being limited to the exemplary embodiments set forth herein, rather, these exemplary embodiments are provided so that this disclosure will be thorough and complete, and will fully convey the concept of the inventive concept to a person having an ordinary skill in the art. The scope of the inventive concept is defined by the appended claims, and like reference numerals refer to like elements throughout.

Unless otherwise defined, all terms (including technical and scientific terms) used herein have the same meaning as commonly understood by a person having an ordinary skill in the art to which this inventive concept belongs. It will be further understood that terms, such as those defined in commonly used dictionaries, will not be interpreted in an idealized or overly formal sense unless expressly so defined here.

The terminology used herein is for the purpose of describing particular embodiments only and is not intended to limit the inventive concept. As used herein, the singular forms are intended to include the plural forms as well, unless the context clearly indicates otherwise. It will be further understood that the terms "comprise" and/or "comprising" used herein do not preclude the presence or addition of one or more other elements in addition to the mentioned elements.

Below, exemplary embodiments of the inventive concept will be described in detail with reference to the accompanying drawings.

FIG. 1 is a schematic view showing an on screen display (OSD) system 1 according to an exemplary embodiment.

As shown in FIG. 1, the OSD system 1 according to an exemplary embodiment of the inventive concept includes a camera 10 configured to obtain an image by recording a specific area and generate first OSD information with regard to the obtained image, and includes a plurality of terminals 20*a*-20*d* configured to transmit second OSD information to the camera 10 or receive and synthesize the image and OSD information from the camera 10. The camera 10 and the terminals 20*a*-20*d* are connected by wire or wirelessly and exchange image data and OSD information data.

In a method of using the OSD system according to an exemplary embodiment of the inventive concept, the camera 10 of the OSD system 1 records a specific area to obtain an image. Then, the first OSD information is generated with regard to the obtained image, and the image and the first OSD information are then transmitted to the terminals 20a-20d. In this case, the image and the first OSD information are not synthesized, and are separately transmitted. Further, a user authorized as an administrator may generate the second OSD information and transmit it to at least one of the terminals 20a-20d. In this case, the second OSD information may be transmitted to this terminal via the camera 10 or a separate server. If one of the terminals 20a-20d receives the image and the first or second OSD information, whether to synthesize the received image and the received OSD information is determined according to authorization of a user or an extent to which a screen is split. If a user has authorization, a synthesized image is displayed. On the other hand, if a user does not have authorization, only the received image, which is not synthesized with the received OSD information, is displayed. Further, if there are few split screens in the terminal, the synthesized image is displayed. On the other hand, if there are many split screens in the terminal, only the received image, which is not synthesized with the received OSD information, is displayed. Thus, it is easy to transmit various pieces of OSD information to another user, upon which it is determined whether to provide the OSD information according to the authorization of the user.

The camera 10 records a specific area and obtains an image. The camera 10 may be installed in a space away from a place at which the plurality of terminals 20a-20d are located. According to an embodiment of the inventive concept, the camera 10 may be a pan-tilt camera capable of panning and tilting movements. Alternatively, the camera 10 may be a 360° camera that has recently been introduced. The 360° camera refers to a camera that does not autonomously have the physical panning or tilting movement but includes a plurality of fisheye lenses for omnidirectional and simultaneous recording. In this case, an image obtained by the 360° camera is panned and tilted by software installed in at least one of the terminals 20a-20d. According to an embodiment of the inventive concept, the camera 10 is not limited to these cameras and may employ various other cameras.

The terminals 20a-20d are connected to the camera 10 by wire or wirelessly, and at least one of the terminals 20a-20d receives the image obtained by the camera 10 and the first OSD information. When receiving the image and the first OSD information, the terminal determines whether to synthesize the image and the first OSD information according to the authorization of the user or the extent to which the screen of the terminal is split. Further, a synthesized image or a non-synthesized image is displayed through a monitor 23 (see FIG. 5) included in the terminal. The terminals 20a-20d may include a smartphone, a tablet personal computer (PC), a laptop computer, or a like portable and mobile device, but not limited thereto. Alternatively, the terminals 20a-20d may include a stationary device such as a desktop computer, etc.

Here, on screen display (OSD) refers to a function of directly displaying a variety of pieces of information to a user separately from an image displayed on a screen in a display device such as the monitor 23. In general, the OSD is configured to display a window for a display device's own settings such as brightness, RGB adjustment, vertical and horizontal sizing, positioning control, etc. However, according to an embodiment of the inventive concept, the OSD information indicates information related to an image displayed through the monitor 23 rather than the settings of the monitor 23 of the terminal. For example, the OSD indicates personal information 42 of a person shown in the image, a privacy mask 43, a heat map 41, an image 44 of a license plate of a vehicle when the license plate is recognized, information 45 and 46 directly generated by a user who is authorized as an administrator, etc. as will be described later in reference to FIGS. 7-12.

An arrow A shown in FIG. 1 indicates a transmission path for image data transmitted from the camera 10 to the terminals 20a-20d. The terminals 20a-20d and their users may be located at different places. In addition, a server is further provided in a wired or wireless communication network wherein the camera 10 and the terminals 20 are connected such that the camera 10 can exchange data and signals through the server.

The arrow B shown in FIG. 1 indicates a transmission path for the second OSD information generated in a first terminal 20a by a first user 30a authorized as an administrator and transmitted to the camera 10. Further, the arrow C shown in FIG. 1 indicates a transmission path for the first OSD information generated in the camera 10 and the second OSD information transmitted to the camera 10 and transmitted to each of the terminals 20a-20d. When the second OSD information is to be transmitted to the second to fourth terminals 20b-20d, it is transmitted through transmission path B and then the transmission path C via the camera 10. However, if the second OSD information is to be transmitted to the first terminal 20a, it merely stays in the first terminal 20a instead of being transmitted to the camera 10 and then transmitted to the first terminal 20a because the second OSD information is first generated in the first terminal 20a.

FIG. 1 illustrates that only one person, i.e. the first user 30a, is authorized as an administrator, and thus the second OSD information is generated in the first terminal 20a, but the inventive concept is not limited thereto. If a plurality of users are authorized as administrators, the second OSD information may be generated from each of the terminals 20a-20d.

Figure 2:
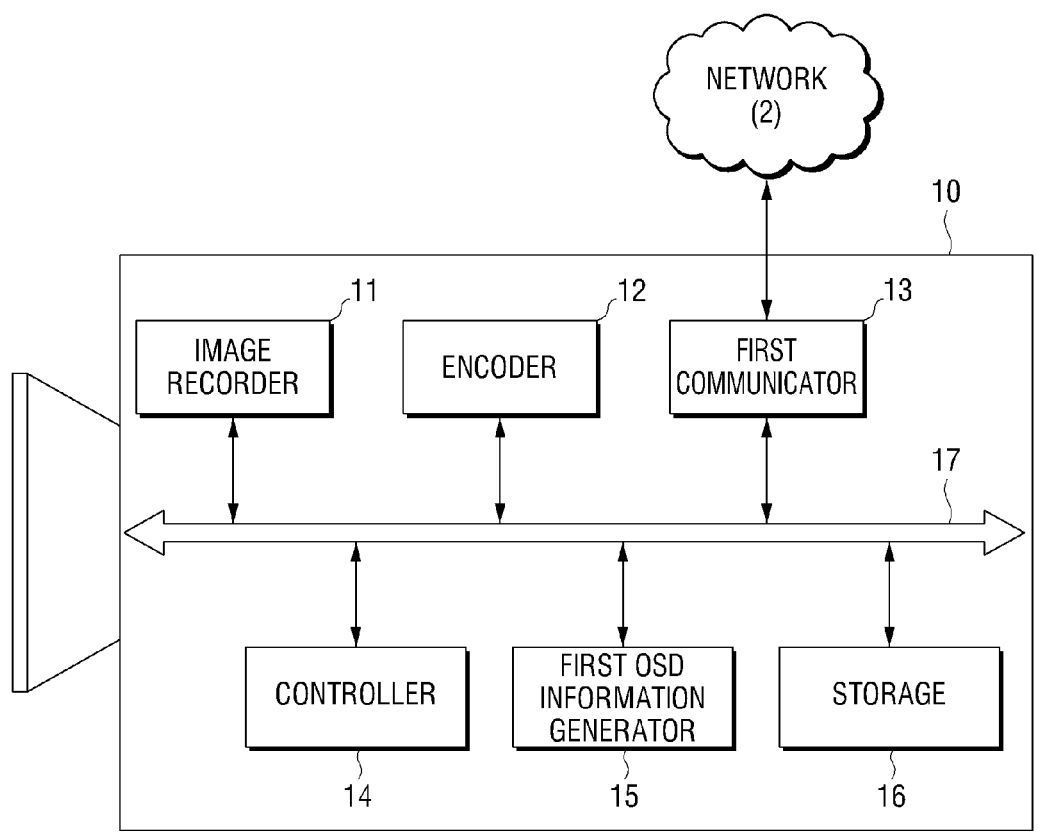
FIG. 2 is a block diagram showing details of a camera 10 according to an embodiment of the inventive concept.

FIG. 2 is a block diagram showing details of the camera 10 according to an exemplary embodiment of the inventive concept.

The camera 10 includes an image sensor 11 configured to receive an image signal and generate an image, an encoder 12 configured to encode the generated image, a controller 14 configured to control operations of elements in the camera 10 and extract basic information for generating the first OSD information from the image, a first OSD information generator 15 configured to generate the first OSD information based on the basic information extracted by the controller 14, a first communicator 13 configured to transmit the image and the OSD information data to the terminals 20a-20d, and a storage 16 configured to store the generated image and OSD information data.

The camera 10 employs a bus 17 through which the image sensor 11, the encoder 12, the controller 14, the first OSD information generator 15, the first communicator 13, the storage 16, and like elements can communicate with one another. All such elements may be directly connected to the bus 17 or connected through one or more interfaces or adapters. The bus 17 is connected to a wide-range of sub systems. The bus 17 may include a memory bus, a memory controller, a peripheral bus, a local bus, and combination thereof.

The image sensor 11 receives an image signal corresponding to a specific area and generates an image. The image sensor 11 generally includes a charge coupled device (CCD), a complementary metal-oxide semiconductor (CMOS) image sensor, or the like imaging device. The CCD accumulates and transmits electrons generated by the photoelectric effect when light is emitted to a plurality of photodiodes. In this case, change in the amount of electrons generated by the amount of photons is analyzed to reconstruct information, thereby generating image information for forming a screen. The CCD has advantages of a sharp image and less noise, but disadvantages of high power consumption and low processing speed.

The CMOS image sensor is an image sensor using a complementary metal oxide semiconductor (CMOS), in which one amplifier is provided per cell and directly amplifies and transmits the electrons generated by the light as an electric signal. The CMOS image sensor is inexpensive and has low power consumption and high processing speed, but has much noise.

The encoder 12 encodes a generated image and outputs compressed image data. As interest in an ultrahigh definition (UHD) image has recently been on the rise, standardization of high efficiency video coding (HEVC) for encoding the UHD image has been completed, thereby enhancing encoding efficiency two or more times greater than that of H.264/MPEG-4 AVC. Further, MPEG4, H.264/MPEG-4 AVC, HEVC, or the like generally used in recent years may be used as a codec for encoding the image, but various kinds of codecs may be used without limitation.

The first communicator 13 is connected to a second communicator 21 of each of the terminals 20a-20d through a network 2 and transmits and receives the image and the OSD information data by wire or wirelessly. In this case, the first communicator 13 does not synthesize the image and the first OSD information but transmits them separately. For example, the first communicator 13 modulates and frequency-upconverts the image and the OSD information data and transmits them to the second communicator 21 of each of the terminals 20a-20d, or frequency-downconverts and demodulates the OSD information data or a signal received from the terminals 20a-20d. With this process, the first communicator 13 may receive data or a signal from the terminal 20, or transmit data or a signal to each of the terminals 20a-20d. The network 2 may include the Internet, a wide area network (WAN), a local area network (LAN), a telephone network, a direct connection communication, etc. and may employ a wired or wireless communication method. In this case, a network interface may be configured to receive communication data in the form of one or more packets from the network 2, or configured to transmit the communication data in the form of one or more packets to the network 2. The network interface may include a network interface card, modem, etc.

The controller 14 controls operations of the elements in the camera 10, and extracts basic information for generating the first OSD information through the image. According to an embodiment of the inventive concept, the controller 14 may employ a central processing unit (CPU), a micro controller unit (MCU), a digital signal processor (DSP), etc. but may employ various other logic operation processors without limitation. Details of the controller 14 will be described later.

The first OSD information generator 15 generates the first OSD information based on the basic information extracted by the controller 14. As described above, the first and/or second OSD information according to an embodiment of the inventive concept refers to information related to an image to be displayed on the monitor 23 rather than the settings of the monitor 23 of the terminal 20. In particular, the first OSD information refers to OSD information generated in the camera 10 and transmitted to the terminal 20. For example, the first OSD information denotes the personal information 42 of a person to be displayed in the image, the privacy mask 43, the heat map 41, the license plate image 44 of the vehicle, etc. Further, the basic information may be information required to generate the personal information 42 of a person to be displayed in the image, the privacy mask 43, the heat map 41, the license plate image 44 of the vehicle, etc.

The storage 16 stores the image and the first OSD information data. In this case, the image and the first OSD information are not synthesized yet, and thus two kinds of data are separately stored. Further, in order to appropriately display the personal information 42 or the privacy mask 43 among the pieces of OSD information to be displayed on the image in the OSD system 1, it is required to recognize a human face. The storage 16 may store beforehand a plurality of pieces of learning data about human faces so as to allow the camera 10 to recognize a human face. Further, the storage 16 may store beforehand a plurality of pieces of learning data about numerals to automatically recognize a license plate number of a vehicle.

The storage 16 may be internally provided in the camera 10 as a medium readable by a computer or the like device. In this case, the storage 16 may be a flash memory that is compact and lightweight. Alternatively, the storage 16 may include various kinds of memory devices such as a random access memory (RAM), a read only memory (ROM), and a combination thereof. Further, the storage 16 may involve a basic input/output system (BIOS) or firmware with basic routines needed for booting in the camera 10. However, with a network camera system, a network video recorder (NVR) or like additional device may be provided without limitation.

The camera 10 may preferably include a digital camera that takes 15 to 30 two-dimensional frames per second and converts them into moving image data by digital conversion, but is not limited thereto. If the camera 10 is not a digital camera, an analog/digital (A/D) converter is separately provided since the obtained image is an RGB analog image signal. On the other hand, if the camera 10 is a digital camera, there is no need for an A/D converter. The image obtained by the camera 10 is transmitted to the terminal 20 through wired or wireless communication and displayed through the built-in monitor 23 of the terminal 20.

Figure 3:
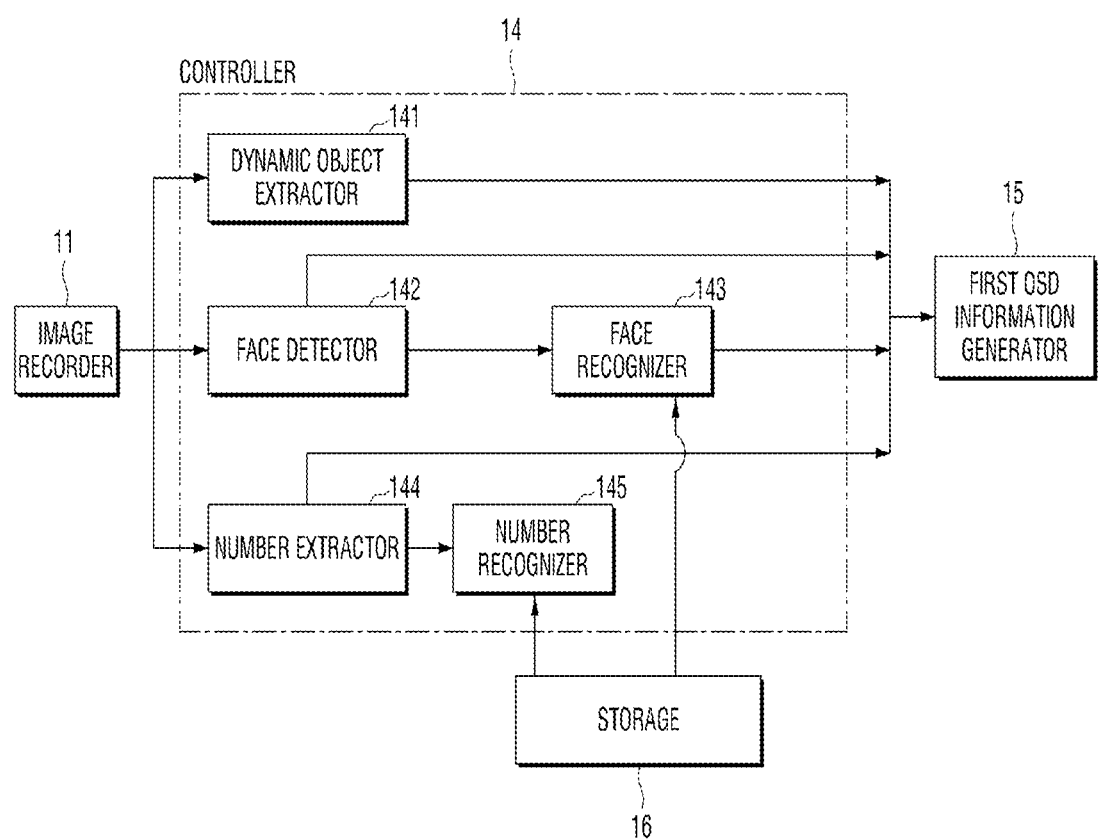
FIG. 3 is a block diagram showing details of a controller 14 according to an embodiment of the inventive concept.

FIG. 3 is a block diagram showing details of the controller 14 according to an exemplary embodiment of the inventive concept.

The controller 14 may selectively include a cache memory as a local storage for temporarily storing instructions, data, or computer addresses. The storage 16 may store a software module for realizing specific embodiments, and the controller 14 may execute the software module or instruction stored in the storage 16.

The controller 14 includes a dynamic object extractor 141, a face detector 142, a face recognizer 143, a number extractor 144, and a number recognizer 145.

The dynamic object extractor 141 extracts an object having a motion from an image in order to generate a heat map 41. Here, the heat map 41 refers to a visual graphic picture of representing various kinds of information with colors in the form of heat distribution. The dynamic object extractor 141 first estimates a background area from an image obtained by the image sensor 11. The background area may be estimated based on an area of the image in which there is no motion for a certain period of time. After estimating the background area, a dynamic image may be extracted by excluding the background area from the image.

The controller 14 has a function of automatically recognizing a human face in an image, and therefore includes the face detector 142 and the face recognizer 143.

The face detector 142 detects a facial region from the image obtained by the image sensor 11. First, the face detector 142 detects a facial region candidate through an image processing algorithm, based on an extracted histogram characteristic. Here, the facial region candidate refers to a region which is highly likely to be determined as a facial region in the input image. The face detector 142 stores beforehand a learned classifier to determine whether a searched area is an object or a background.

In general, the classifier stored beforehand in the face detector 142 may employ various methods such as Adaboost, Random Forest, Support Vector Machine (SVM), Neural Network (NN), etc. According to an embodiment of the inventive concept, the classifier may be Adaboost, which is a complicated nonlinear classifier for effectively modeling distribution of data to improve recognition performance. The Adaboost makes a strong classifier by combining a plurality of weak classifiers. In this case, 'weak' means that the classifier classifies positive and negative images with low accuracy, and 'strong' means that the classifier classifies positive and negative images with high accuracy. An Adaboost learning algorithm is the most well-known boost algorithm, and has advantages in that it is simple and efficient. The classifier using Adaboost determines whether a feature value extracted in the image is true or not according to certain steps, and thus determines whether a designated area is a facial region.

If the facial region candidate in the image is determined as the facial region, the face recognizer 143 identifies whose face the face of the detected facial region is. The face includes about 200 to 3,000 effective features for recognition. To extract features able to be greatly utilized even with changes in lighting and facial expression among these effective features, a massive database (DB) is subjected to a face recognition module learning process. In general, a feature extraction process for conversion from a normal image space to a feature image space includes a principle component analysis (PCA), a linear discriminant analysis (LDA), etc.

The PCA is suitable for expressing data since a vector maximizing scattering of all pieces of data is used as a basis vector, and also minimizes error in restoring data of a projected low-level space to data of a high-level space. The PCA employs eigenvectors, which are obtained in order of eigenvalues of a data covariance matrix that are orthonormal to one another, as the basis vector to represent the data.

The LDA is a method for recognizing a face by analyzing an eigenvalue in an individual matrix, and refers to a linear classifier that finds linear conversion for maximizing Between Scatter (BS) in classes and minimizing Within Scatter (WS) in classes. If positive data and negative data are given in multidimensional vectors, the LDA projects them into one dimension and obtains a projection vector maximizing the scattering between two classes. Here, Scatter Within (SW) the classes refers to variation when the data is projected into one dimension. On the other hand, Scatter Between (SB) the classes means how far the classes are scattered.

The controller 14 has a function of automatically recognizing a license number of a vehicle displayed on the image. The license number recognition is achieved by finding a license plate of a vehicle in the obtained image and recognizing characters on the license plate through a license plate recognition (LPR) algorithm. To this end, the controller 14 further includes the number extractor 144, and the number recognizer 145.

The number extractor 144 extracts a numerical region from an image obtained by the image recorder 11. First, the image including a license plate number of a vehicle is subjected to image preprocessing. That is, an input image is analyzed with respect to brightness, histogram, etc. and then converted into various candidate images by adjusting an input value of an image filter. Further, the converted candidate image is subjected to preprocessing such as negative imaging, noise canceling, etc. and then various thresholds are determined to thereby extract a binary image.

The binary image is used in a labeling process for labeling groups of pixels within the image, and labels given to the pixels corresponding to the characters are selected. Then, similarity with patterns is compared. The patterns most similar to the labels are used as a recognition value, and correlation between the labels is determined to link the letters. If it is impossible to obtain the license plate area from labeling results, a license plate rectangular area candidate group based on the negative image is used to extract the license plate area.

The number recognizer 145 recognizes what number an extracted number is if a numerical region is extracted from an image. First, positions of the extracted license plates and a degree of incline of each number are obtained to rotate the image with respect to horizontal and vertical references. Further, an image filter is applied to vehicle images variously distorted due to sunlight, shadows, etc. to thereby normalize the license plate area. Further, bright and dark sides and lines are scanned to correct errors and precisely distinguish the characters. Then, the image is converted to have a standard size, and the distinguished characters are compared with a standard pattern previously stored in the storage 16, thereby determining the letters matching the most.

Figure 4:
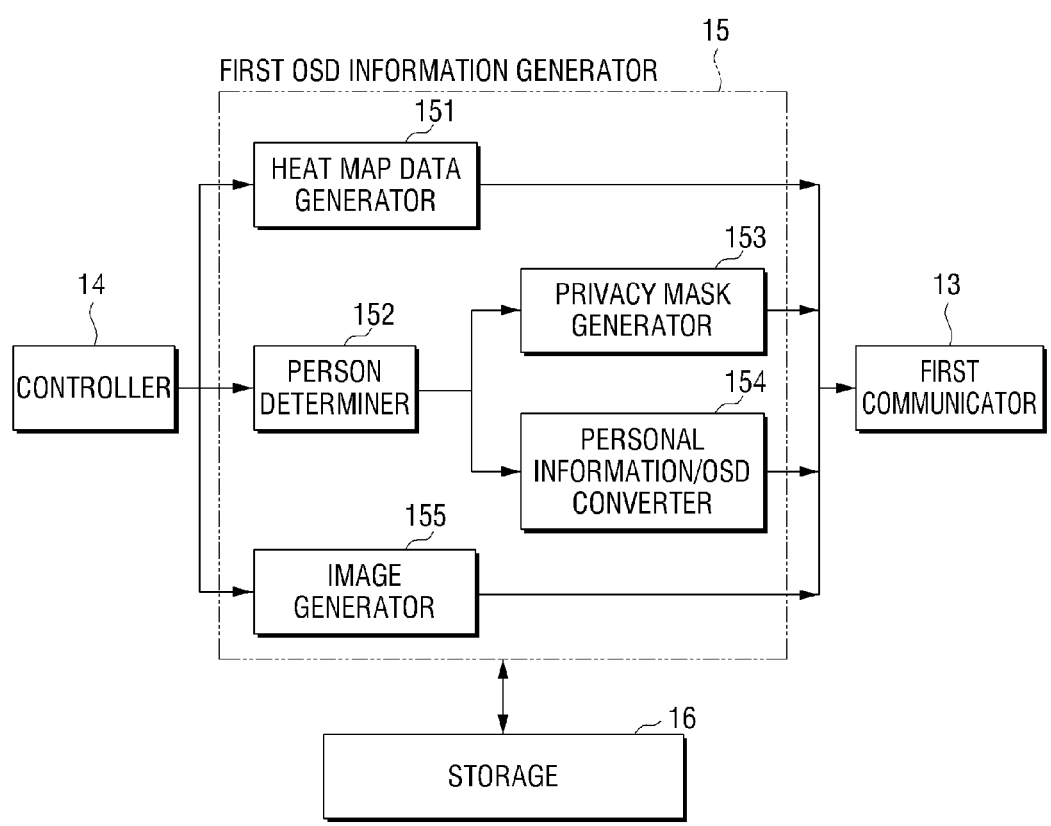
FIG. 4 is a block diagram showing details of a first OSD information generator 15 according to an embodiment of the inventive concept.

FIG. 4 is a block diagram of showing details of the first OSD information generator 15 according to an exemplary embodiment of the inventive concept.

The first OSD information generator 15 receives data for generating an OSD from the controller 14 and generates first OSD information based on the received data. The first OSD information generator 15 includes a heat map data generator 151, a person determiner 152, a privacy mask generator 153, a personal information/OSD converter 154, and an image generator 155.

The heat map data generator 151 generates heat map data 41 by aggregating trajectories of a dynamic object when the dynamic object moves within a specific area captured by the camera 10. According to an exemplary embodiment of the inventive concept, the heat map data generator 151 receives data about the movement of the dynamic object from the dynamic object extractor 141. Further, a frequency number is calculated by accumulating the movements of the dynamic object, and a movement tendency of the object is determined to thereby generate the heat map data 41.

The heat map data 41 generated by the heat map data generator 151 includes information required to generate a heat map image such as pixel coordinates of the trajectory area of the dynamic object, a generation time, an elapsed time after the generation time, etc. Further, the heat map data 41 may include color values according to pixels. An initial color value may be a random color between red and blue, and this color value may be updated as time goes on.

The person determiner 152 determines whether a person with an identified face is a person to be monitored or protected if the face recognizer 143 identifies whose face it is. For example, if unauthorized persons are not allowed in a place where the camera 10 is installed, a person with a face recognized as that of an authorized person stored in the storage 16 is admitted, but a person with a face not recognized as that of the authorized person is regarded as an intruder. In addition, this information is transmitted to the personal information/OSD converter 154 and the personal information 42 of the corresponding person is converted into the first OSD information. As another example, if a place where the camera 10 is installed is a casino, a face recognized as that of a person on a blacklist stored in the storage 16 is determined to be a dangerous person. Then, this information is transmitted to the personal information/OSD converter 154 and the personal information 42 of the corresponding person is converted into the first OSD information. On the other hand, if a face is recognized as that of a person not listed in the storage 16, s/he is determined to be a general customer. Then, this information is transmitted to the privacy mask generator 153 to generate the privacy mask 43 and cover the face of the corresponding person with the privacy mask 43.

The privacy mask generator 153 generates the privacy mask data for persons to be subjected to protection so that the privacy mask 43 can be applied to areas corresponding to the faces of the persons in the image. Here, the privacy mask data includes position coordinates or the like when a person to be subjected to protection is displayed in the image. Further, the face of the person indicates a face of a person determined to be subjected to the protection, in particular, by the person determiner 152. Further, the privacy mask data may further include position coordinates or an ID corresponding to the face of the person in the image. Therefore, the terminal 20 can correctly recognize who will be subjected to the protection and covered with the privacy mask 43.

The personal information/OSD converter 154 converts the personal information 42 into OSD information so that the personal information 42 can be displayed around an area corresponding to a face of a person in an image. Here, the personal information 42 includes pieces of information about a specific person such as name, age, department, criminal record, etc. of the specific person stored beforehand in the storage 16. Here, the face of the person denotes a face of a person determined to be monitored, in particular, by the person determiner 152. Further, the OSD information may further include position coordinates or an ID corresponding to the face of the person in the image. Therefore, the terminal 20 can accurately recognize to which person to be monitored the personal information 42 will be tagged.

The OSD information obtained by converting the heat map data, the privacy mask data, and the personal information is a kind of metadata and is used as the first OSD information that will be transmitted together with the image to the terminal 20 in the future. Further, the terminal 20 may generate a synthesized image by synthesizing the received first OSD information and image.

The image generator 155 generates the license plate image 44 of the vehicle from the image. If the number extractor 144 extracts the license plate area of the vehicle, the image generator 155 generates only the image 44 corresponding to the license plate area of the vehicle from the image. This image 44 itself is used as the metadata, and serves as the first OSD information that will be transmitted together with the image to the terminal 20 in the future. Alternatively, without limitation, only position coordinates about the area corresponding to the license plate of the vehicle in the image may be transmitted as the metadata to the terminal 20, and the terminal 20 may extract the image 44 from the image based on the position coordinates. That is, the metadata may be variously formed without limitation as long as the license plate image 44 of the vehicle is synthesized with and displayed on the image.

Figure 5:
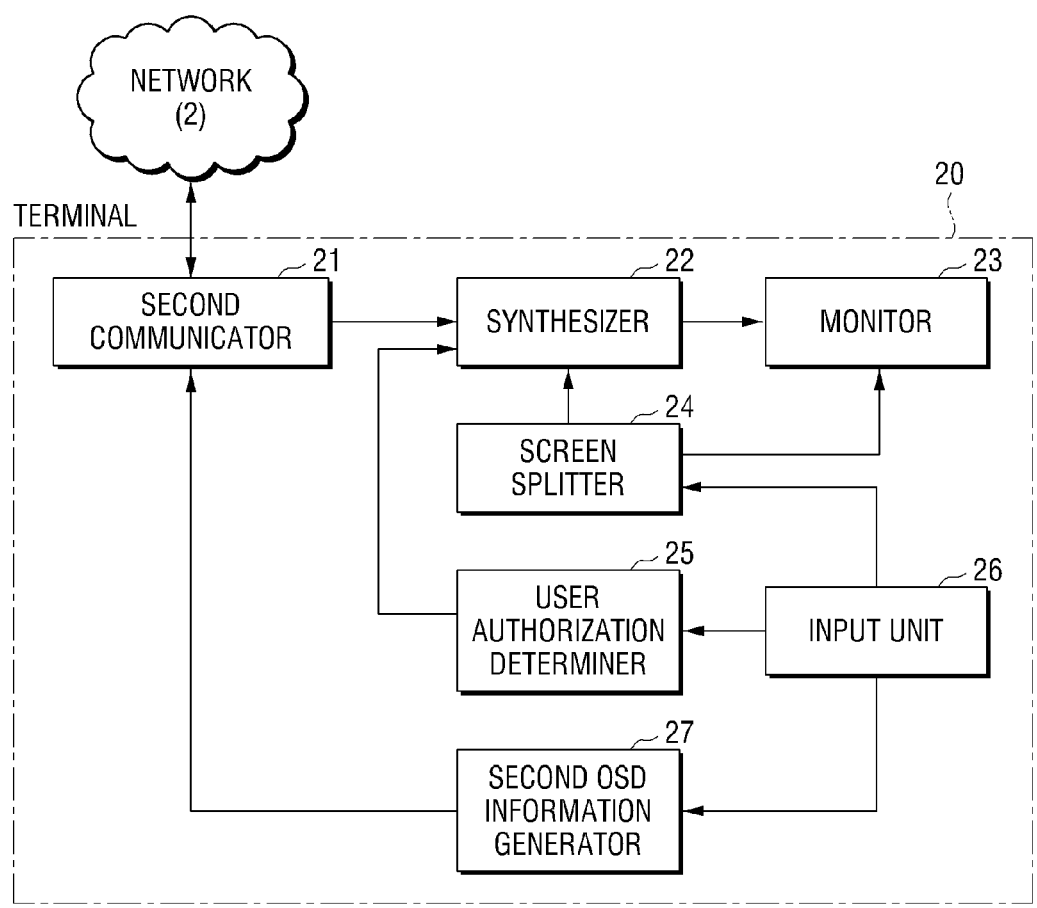
FIG. 5 is a block diagram showing details of a terminal 20 according to an embodiment of the inventive concept.

FIG. 5 is a block diagram of showing details of a terminal 20, which may correspond to one of the terminals 20*a*-20*d* of FIG. 1, according to an embodiment of the inventive concept.

The terminal 20 transmits the second OSD information to the camera 10 or receives the image and OSD information from the camera 10, thereby synthesizing the received image and the received OSD information. In this case, the terminal 20 determines whether to synthesize the received image and the received OSD information, based on the authorization of the user or the extent to which the screen of the terminal 20 is split. The terminal 20 includes the second communicator 21, a synthesizer 22, the monitor 23, a screen splitter 24, a user authority determiner 25, an input 26, and a second OSD information generator 27.

The terminal 20 may also employ a bus (not shown) through which the second communicator 21, the synthesizer 22, the monitor 23, the screen splitter 24, the user authority determiner 25, the input unit 26, the second OSD information generator 27, and like elements can communicate with one another. All these elements may be directly connected to the bus (not shown) or may be connected through one or more interfaces or adapters. The bus (not shown) is connected to a wide-range of sub systems. The bus (not shown) may include a memory bus, a memory controller, a peripheral bus, a local bus, and a combination thereof.

The second communicator 21 exchanges the image and the OSD information data with the first communicator 13 of the camera 10 by wire or wirelessly. In this case, the second communicator 21 receives the image and the first OSD information which are not synthesized but separated. For example, the second communicator 21 modulates and frequency-upconverts the OSD information data or the signal and transmits them to the first communicator 13 of the camera 10, or frequency-downconverts and demodulates the image and the OSD information data received from the camera 10. With this process, the second communicator 21 may receive data or a signal from the camera 10 or transmit the data or the signal to the camera 10. The network 2 may include the Internet, a WAN, a LAN, a telephone network, a direct connection communication, etc. and may employ a wired or wireless communication method. In this case, a network interface may be configured to receive communication data in the form of one or more packets from the network 2, or to transmit the communication data in the form of one or more packets to the network 2. The network interface may include a network interface card, modem, etc.

The synthesizer 22 generates a synthesized image by synthesizing the image and the OSD information according to the authorization of the user or the extent of to which the screen is split. Specifically, if the user has authority, the synthesized image is displayed. On the other hand, if the user has no authorization, only the image not synthesized with the OSD information is displayed. Further, if there are few split screens, the synthesized image is displayed. On the other hand, if there are many split screens, only the image, which is not synthesized with the OSD information, is displayed. Details of various synthesized images generated according to the kind of OSD information will be described later.

The monitor 23 is configured to display a synthesized image obtained by synthesizing the image and the OSD information or to display a non-synthesized image. The monitor 23 may be variously formed using a liquid crystal display (LCD), an organic light emitting diodes (OLED), a cathode ray tube (CRT), a plasma display panel (PDP), etc. The monitor 23 may be connected to the bus (not shown) via a video interface, and the data transmission between the monitor 23 and the bus (not shown) may be controlled by a graphic controller.

If the terminal 20 does not provide a touch function, the input unit 26 is separately provided. In general, a mouse, a keyboard, a joystick, a remote controller, etc. are used as the input unit 26 the most. The input unit 26 may be connected to the bus (not shown) through an input interface such as a serial port, a parallel port, a game port, a universal serial bus (USB), etc. FIG. 5 shows that the terminal 20 separately includes the input unit 26, but the terminal 20 is not limited thereto. Alternatively, if the terminal 20 supports the touch function, the monitor 23 may include a touch sensor. In this case, the user may directly input a touch signal through the monitor 23. The touch sensor may be integrally equipped in the monitor 23, sense a touch made on the monitor 23, and detect coordinates, the number and strength of touches, etc. in the area where the touch is made. The touch sensor may employ various types of touch sensors such as a capacitive type, a resistive type, a surface acoustic wave type, an infrared ray type, a proximity type, etc. according to a touch detection method. Further, the touch may be made with a finger, but is not limited thereto and may be achieved using a stylus pen or the like having a tip where a micro-current can flow. Although the terminal 20 supports the touch function, a separate touch pad may be provided as the input unit 26 if the monitor 23 does not include the touch sensor.

The screen splitter 24 splits the screen into a plurality of split screens in response to a user's input or automatically, thereby generating a thumbnail image. If there are three images to be displayed, the monitor 23 generates thumbnails including three split screens. If there are six images, thumbnails are generated to include six split screens.

In this case, a plurality of cameras 10 may be provided. The plurality of cameras 10 may be installed at different locations and record different areas, thereby taking different images. Further, the obtained image data may be transmitted to a plurality of terminals including the terminal 20. Then, the monitor 23 may display the plurality of images through the plurality of split screens. If the camera 10 is the 360° camera, one camera takes an omnidirectional image. In this case, if one original image obtained by the 360° camera is directly transmitted to the terminal 20, a plurality of calibrated images may be generated by dewarping the original image through software installed in the terminal 20. Further, the plurality of calibrated images may be displayed through the plurality of split screens in the monitor 23. However, without limitation, various methods may be used as long as the plurality of images can be displayed through the plurality of split screens in the monitor 23 of the terminal 20.

If there are relatively many split screens as compared to the size of monitor 23, the size of split screen is too small for a user to monitor the synthesized images even if the image was to be synthesized with the OSD information. On the other hand, if there are relatively few split screens as compared to the size of monitor 23, the size of split screen is big enough to provide the OSD information to a user. In other words, the number of split screens as compared to the size of monitor 23 is one of criteria for determining whether to synthesize the image with the OSD information. Further, the criteria may be experimentally established in accordance with how easy it is for a user to perform monitoring.

The user authorization determiner 25 determines authorization of a user who is using the terminal 20. For example, if a user inputs an ID and a password through the input unit 26 and logs in to the OSD system 1, it is possible to know who the user is. Accordingly, it is possible to directly ascertain the authorization of the user.

In the OSD system 1, the users may be graded beforehand. For example, the users may be graded as an administrator, an operator, a general user, a guest, etc. Further, a user authorized as an administrator can directly generate the second OSD information and monitor various OSD information. A user authorized as an operator can monitor OSD information without limitation and restrictively generate the second OSD information by obtaining permission from an administrator. The general user can restrictively monitor OSD information by receiving permission from an administrator. The guest can monitor only the image without monitoring OSD information.

The second OSD information generator 27 generates the second OSD information based on an input received through the input unit 26. As described above, according to an embodiment of the inventive concept, the OSD information indicates information related to an image displayed through the monitor 23 rather than the settings of the monitor 23 of the terminal 20. In particular, the second OSD information indicates OSD information generated in the terminal 20 and transmitted to another terminal 20 via the camera 10 or a separate server. For example, the second OSD information indicates information 45 and 46 directly generated by a user authorized as an administrator, that is, descriptions about a specific object displayed on the image or a query, a picture, an emoticon, etc. to be sent to another user.

Although it is not illustrated in the drawings, the terminal 20 may further include the storage 16 capable of storing the image and the OSD information data. In this case, two kinds of data such as the image and the OSD information may be separately stored, or the synthesis image output from the synthesizer 22 may be stored. The storage 16 may be internally provided in the terminal 20 as a medium readable by a computer or the like device. In this case, the storage 16 may be a flash memory that is compact and lightweight. Alternatively, the storage 16 may be provided as a separate device outside the terminal 20.

Although it is not illustrated in the drawings, the terminal 20 may further include an image processor for decoding received compressed image data and performing other image processing. Further, the image processor may include a buffer memory which temporarily stores frame data of a standby image, a graphic renderer which renders the image, and a superimposer which overlays a plurality of images to generate a complex image. However, without limitation, the image processor may not include some among the buffer memory, the graphic renderer, and the superimposer described above if some of the processes for encoding and decoding the image and other image processing are not needed. That is, the image processor may be variously configured according to methods of processing an image received from the camera 10.

Besides, the terminal 20 may include one or more output devices such as a loudspeaker, a printer, etc. Such an output device may be connected to a bus (not shown) through an output interface such as a serial port, a parallel port, a game port, a USB, etc.

Figure 6:
FIG. 6 is a view showing an image obtained by the camera 10 recording a specific area according to an embodiment of the inventive concept.

FIG. 6 is a view showing an image obtained by the camera 10 recording a specific area according to an exemplary embodiment of the inventive concept.

As shown in FIG. 6, the camera 10 records a specific area and obtains an image. The obtained image may include objects such as, vehicles, many persons, etc. In the CCTV system, information about such objects, a movement tendency, and the like are very important for a user who monitors the image. In particular, if many users are allowed to simultaneously monitor an image, information has to be easily and rapidly exchanged between many users without a separate device. Further, there is a need for automatically determining whether or not to share the information according to user authorization and for selectively opening the information to the public.

Figure 7:
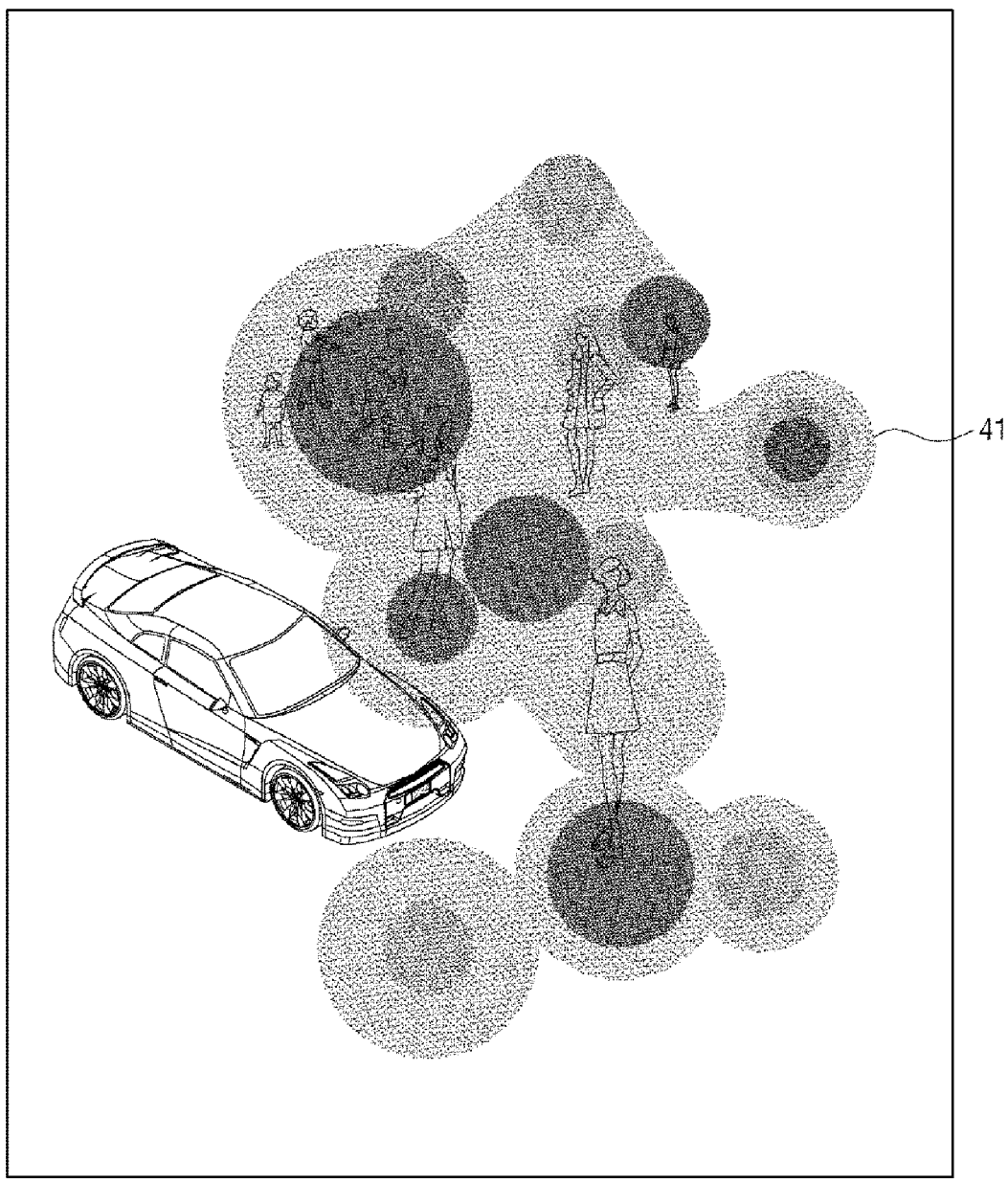
FIG. 7 is a view showing a synthesized image where the obtained image of FIG. 6 has been synthesized with a heat map 41.

FIG. 7 is a view showing a synthesized image where the obtained image of FIG. 6 is synthesized with the heat map 41, according to an exemplary embodiment.

If the first OSD information received from the camera 10 in the terminal 20 is the heat map data, the synthesizer 22 synthesizes the image with the heat map 41 based on the heat map data. The synthesizer 22 reflects predetermined colors in pixels corresponding to pixel coordinates included in the heat map data and synthesizes it with the received image, thereby generating a heat map image as shown in FIG. 7. An initial color value according to pixels may be a random color between red and blue. The red may show a high frequency, and the blue may show a low frequency. When an object appears for the first time, its initial color value may correspond to a random color between red and blue.

The synthesizer 22 generates the heat map image by reflecting the initial color value in the pixels. In this case, the synthesizer 22 gradually changes the color of the pixels, which correspond to the trajectories of the dynamic object, into red as time goes on, and gradually changes the color of the pixels that correspond to a stationary position of the dynamic object into blue, thereby updating the heat map image. Alternatively, the pixels corresponding to the trajectories of the dynamic object are gradually changed in color, and the pixels corresponding to a stationary position of the dynamic object are maintained to have the initial color value.

Figure 8:
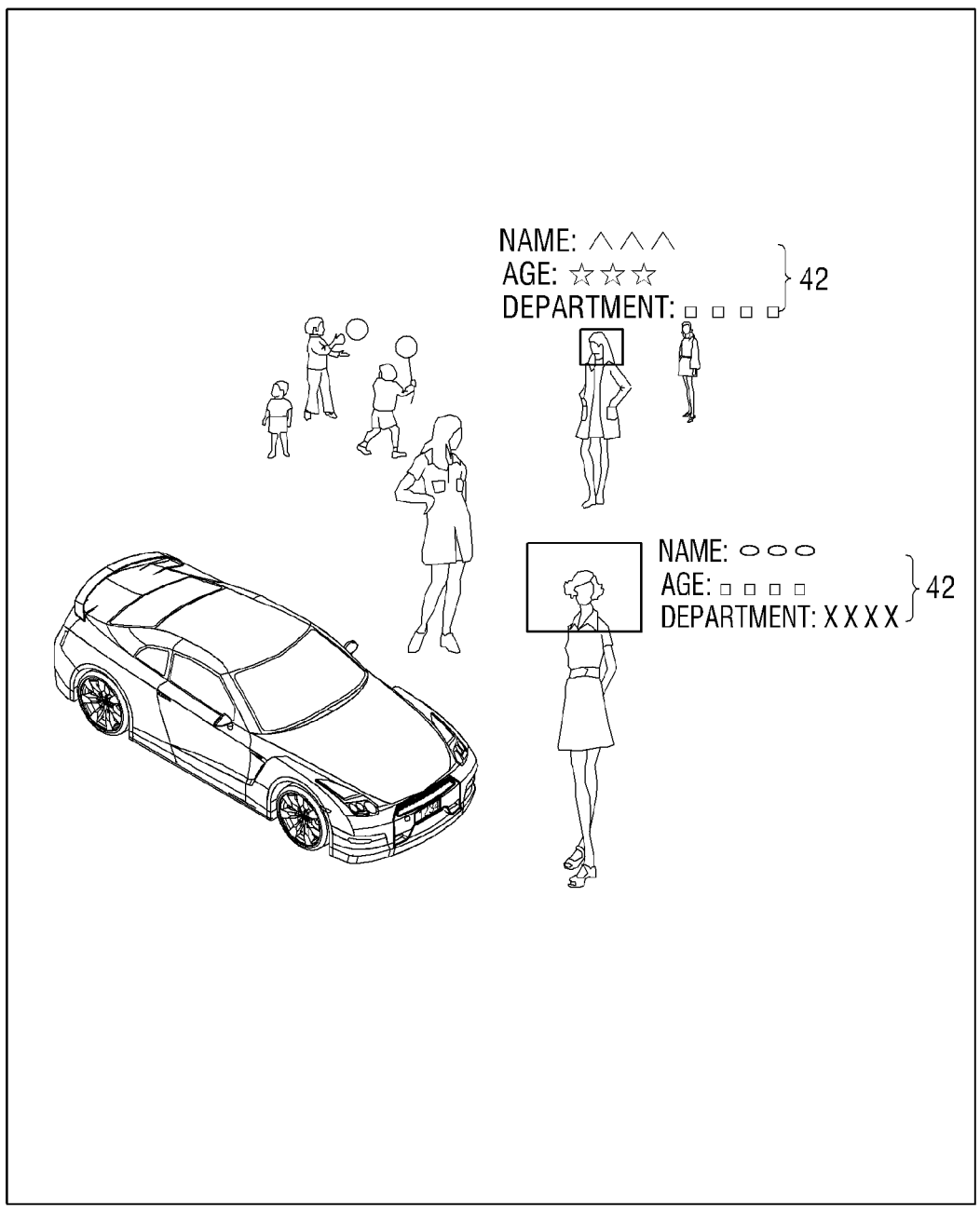
FIG. 8 is a view showing a synthesis image where the obtained image of FIG. 6 is overlaid with personal information 42 of a person.

FIG. 8 is a view showing a synthesized image where the obtained image of FIG. 6 is overlaid with the personal information 42 of a person, according to an exemplary embodiment.

If the first OSD information received from the camera 10 in the terminal 20 is the personal information 42, the synthesizer 22 synthesizes the image with the personal information 42. In this case, the terminal 20 receives the ID or position coordinates corresponding to a face of a person to be monitored. The synthesizer 22 generates a synthesized image as shown in FIG. 8 by synthesizing the image with the personal information 42 so that the personal information 42 can be displayed around an area corresponding to the face of the person in the image.

Figure 9:
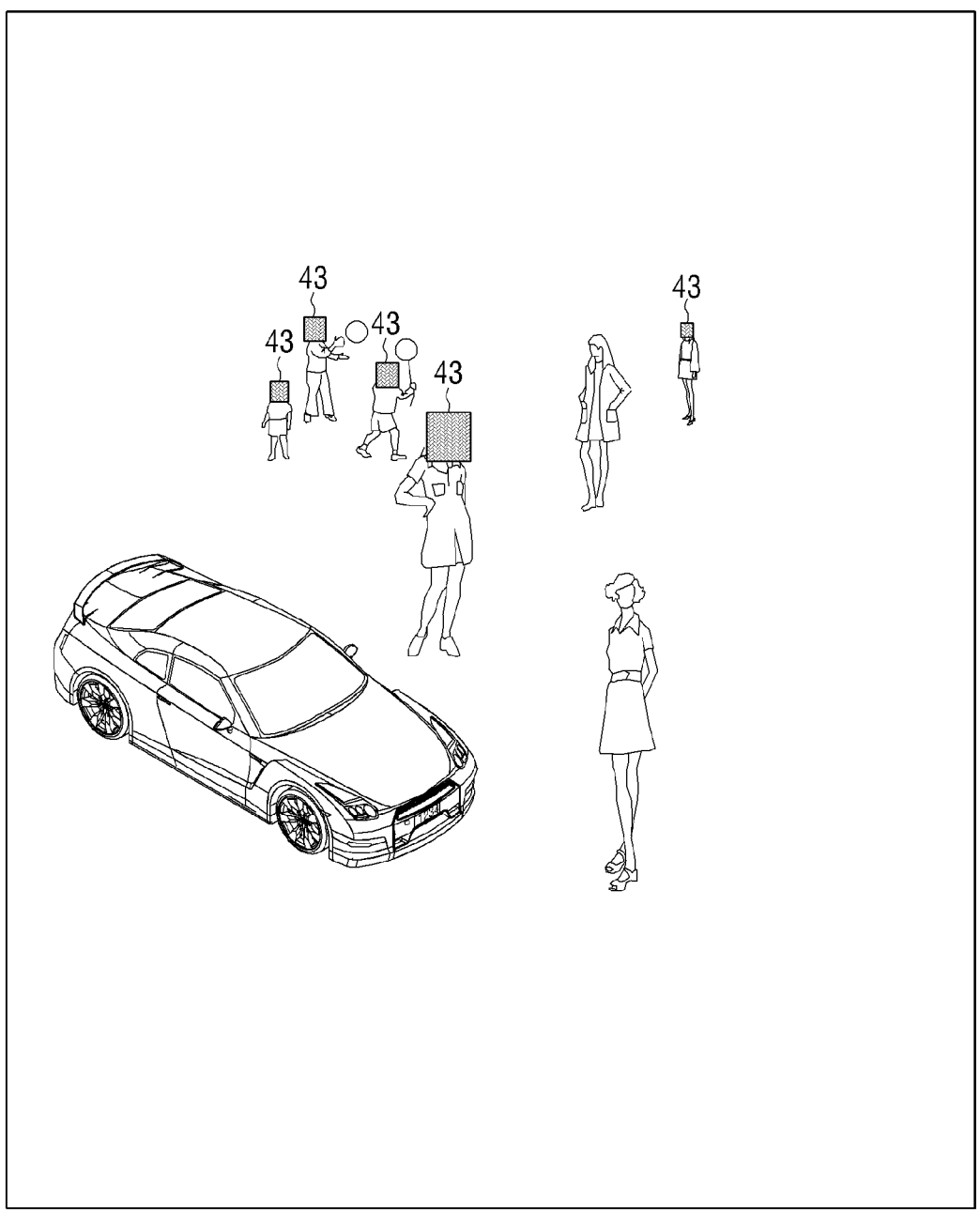
FIG. 9 is a view showing a synthesized image where the obtained image of FIG. 6 has been synthesized with a privacy mask 43 on a face of a person.

FIG. 9 is a view showing a synthesized image where the obtained image of FIG. 6 is synthesized with the privacy mask 43 on a face of a person, according to an exemplary embodiment.

If the first OSD information received from the camera 10 in the terminal 20 is the privacy mask data, the synthesizer 22 synthesizes the image with the privacy mask 43. In this case, the terminal 20 receives the ID or position coordinates corresponding to a face of a person to be subjected to protection. The synthesizer 22 generates a synthesized image as shown in FIG. 9 by synthesizing the image with the privacy mask 43 so that the privacy mask 43 can be applied to an area corresponding to the face of the person in the image.

The privacy mask 43 may be applied in such a manner that the face of the person to be protected is made black through filtering. However, without limitation, the privacy mask 43 may be applied using various methods of blurring the image by mapping the RGB color values of the face of the person to be protected with average color values of surrounding pixels, pixelating the image by adjusting the number of pixels corresponding to the face of the person, and so on.

Figure 10:
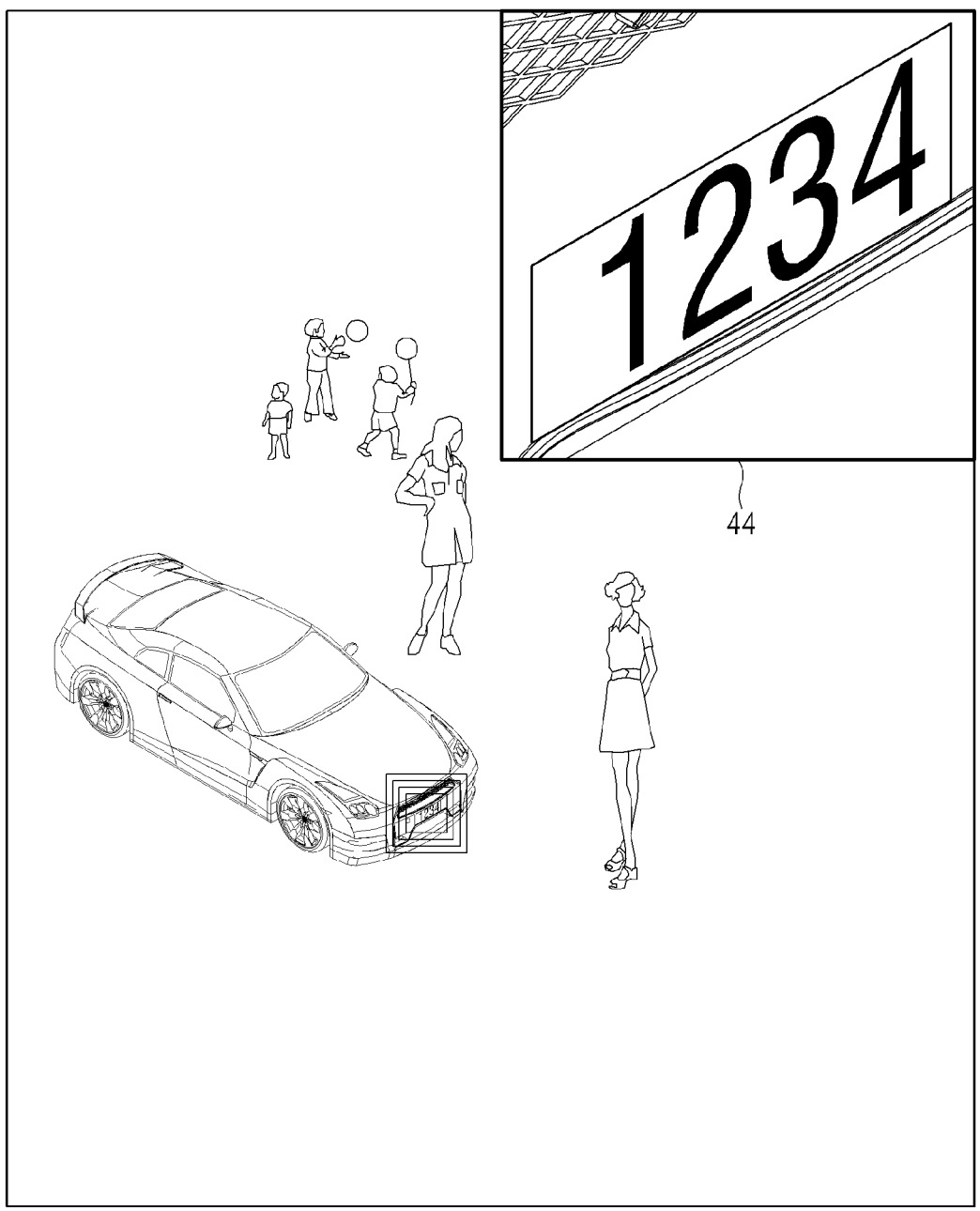
FIG. 10 is a view showing a synthesized image where the obtained image of FIG. 6 has been synthesized with a license plate image 44 of a vehicle.

FIG. 10 is a view showing a synthesized image where the obtained image of FIG. 6 is synthesized with the license plate image 44 of a vehicle, according to an exemplary embodiment.

If the first OSD information received from the camera 10 in the terminal 20 is the license plate image 44 of the vehicle, the synthesizer 22 synthesizes the image with the license plate image 44 of the vehicle. If the license plate image 44 itself of the vehicle is the metadata, the license plate image 44 itself is transmitted through another channel different from that of the image. Further, the synthesizer 22 magnifies the license plate image 44 and then synthesizes the magnified license plate image 44 with the image, thereby generating the synthesized image as shown in FIG. 10. On the other hand, if only position coordinates corresponding to the area of the license plate of the vehicle are the metadata, the synthesizer 22 can extract the license plate image 44 from the image based on the position coordinates. The synthesizer 22 may magnify the license plate image 44 extracted from the image, and then generate the synthesized image as shown in FIG. 10.

Figure 11:
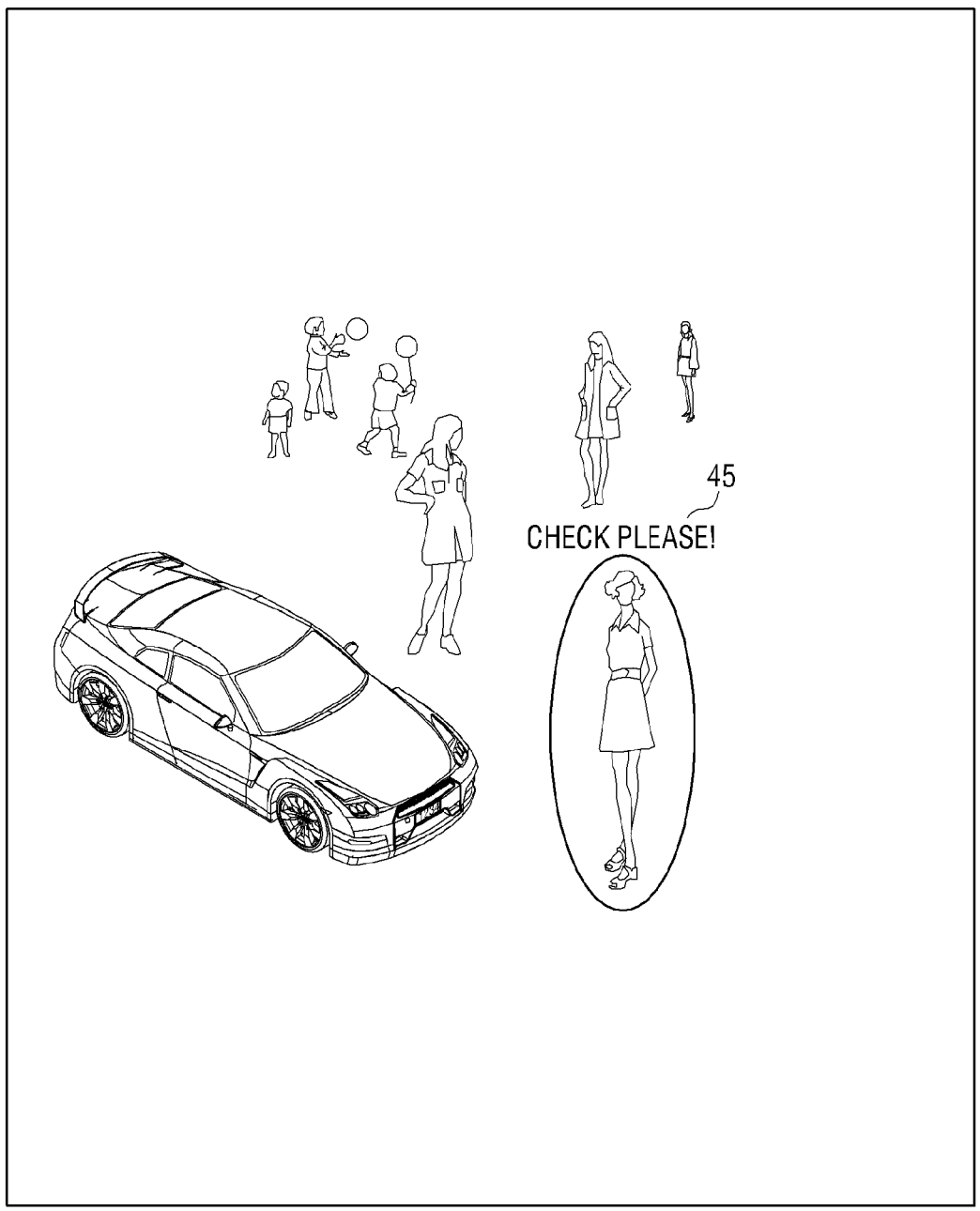
FIG. 11 is a view of showing a synthesized image where the obtained image of FIG. 6 has been synthesized with information 45 and 46 directly generated by a user authorized as an administrator.

FIG. 11 is a view showing a synthesized image where the obtained image of FIG. 6 is synthesized with the information 45 and 46 directly generated by a user authorized as an administrator, according to an exemplary embodiment.

If the second OSD information received from the camera 10 in the terminal 20 is the information 45 and 46 directly generated by the user authorized as an administrator, the synthesizer 22 synthesizes the image with the second OSD information, thereby generating a synthesized image as shown in FIG. 11. In this case, as shown in FIG. 11, the information 45 and 46 generated by the user authorized as an administrator may include description about a specific object, an instruction, or query 45 to be given to another user, and so on.

Figure 12:
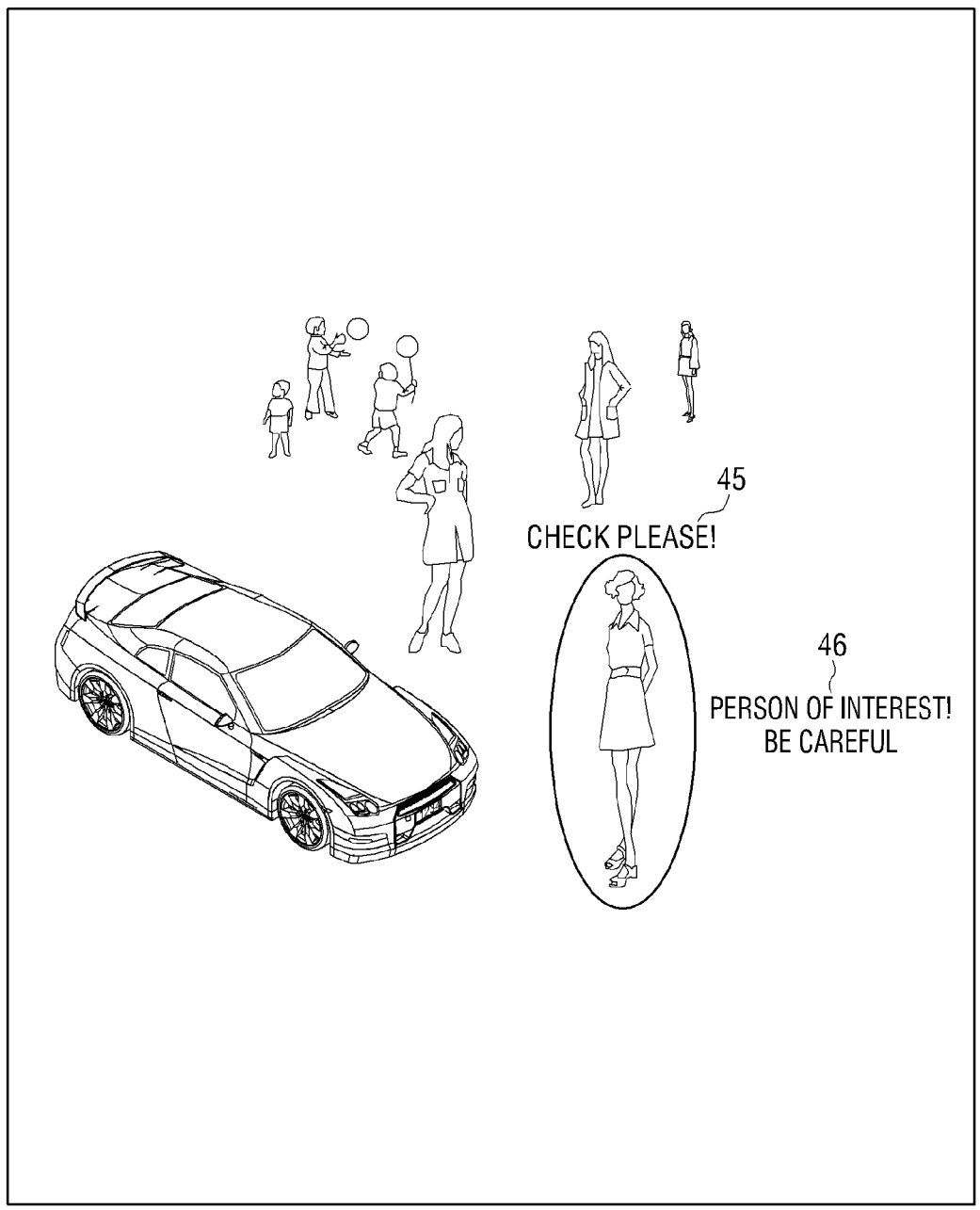
FIG. 12 is a view of showing second OSD information sent by another user in response to the second OSD information sent by the user authorized as an administrator in FIG. 11.

FIG. 12 is a view showing second OSD information sent by another user in response to the second OSD information sent by the user authorized as an administrator in FIG. 11, according to an exemplary embodiment.

As described above, an administrator and a user graded as the operator by obtaining a permission from an administrator can generate the second OSD information. Amongst the users who are monitoring the synthesized image shown in FIG. 11, an administrator and the user graded as the operator by obtaining the permission of an administrator may generate and send different second OSD information as a response 46 to the second OSD information sent in FIG. 11. A synthesizer 22 of a different terminal 20 that receives the different second OSD information synthesizes the image with the different second OSD information, thereby generating a synthesized image as shown in FIG. 12.

Figure 13:
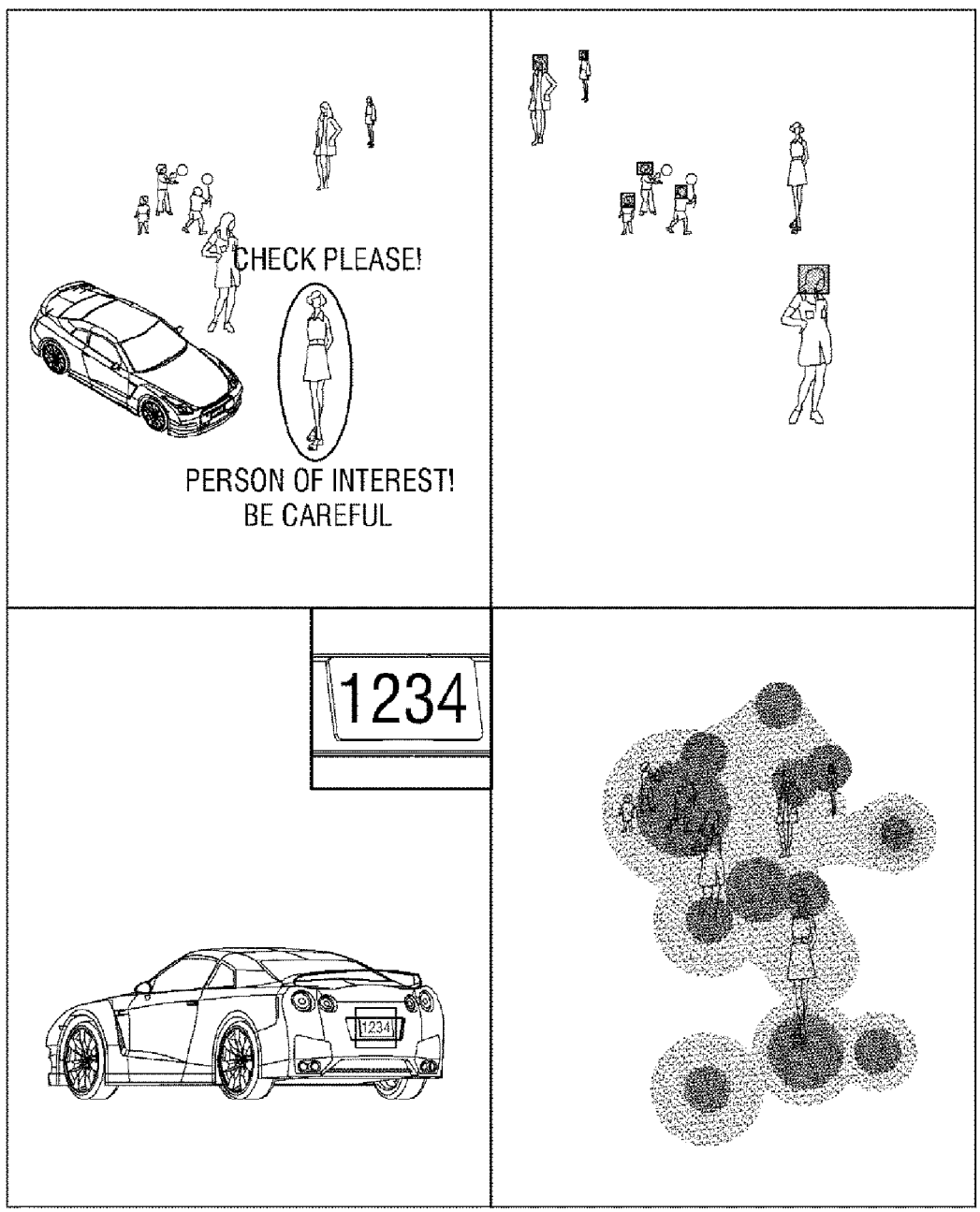
FIG. 13 is a view showing a screen of a monitor 23 according to an embodiment of the inventive concept split into four split screens.

FIG. 13 is a view showing the screen of the monitor 23 split into four split screens, according to an exemplary embodiment.

As described above, the screen splitter 24 of the terminal 20 splits the screen into a plurality of split screens in response to a user's input or automatically, thereby generating a thumbnail image. Meanwhile, if the user is graded as an administrator, an operator, or as a general user who obtains the permission from an administrator, s/he can monitor the OSD information.

In this case, if there are relatively few split screens as compared to the size of monitor 23, the size of a split screen is big enough to provide the OSD information to a user. In this case, the synthesizer 22 of the terminal 20 synthesizes the image with the OSD information to thereby generate the synthesized image. Further, the monitor 23 may display the synthesized image as shown in FIG. 13.

Figure 14:
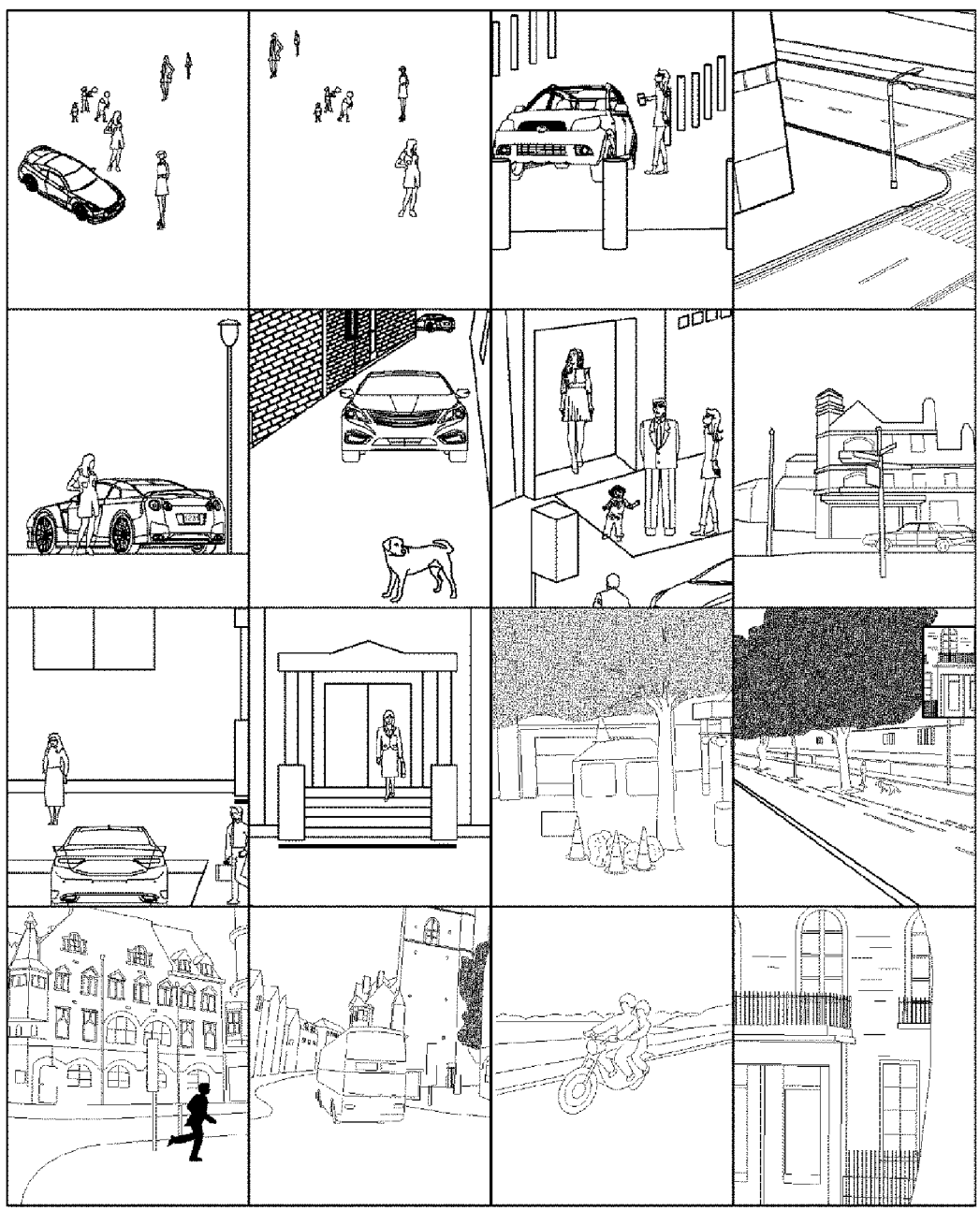
FIG. 14 is a view showing the screen of the monitor 23 according to an embodiment of the inventive concept split into sixteen split screens.

FIG. 14 is a view showing the screen of the monitor 23 split into sixteen split screens, according to an exemplary embodiment.

If there are relatively many split screens as compared to the size of monitor 23, the size of split screen is too small for a user to monitor the synthesized image even if the image was to be synthesized with the OSD information. Therefore, the synthesizer of the terminal 20 does not synthesize the image with the OSD information. Thus, the monitor 23 can display the non-synthesized image as shown in FIG. 14.

It will be understood by a person having an ordinary skill in the art to which the inventive concept belongs that the inventive concept can be materialized in other exemplary embodiments without departing from the technical concept or necessary features. Therefore, the exemplary embodiments described above are merely examples and not construed as limiting the inventive concept. The scope of the inventive concept is defined by the appended claims rather than the detailed description, and all the changes or modifications from the meaning and scope of the appended claims and their equivalents have to be construed as being involved in the scope of the inventive concept.

The invention claimed is:

1. An on screen display (OSD) information sharing system comprising:
    an OSD information generation camera which obtains an image by recording a specific area, and generates first OSD information with regard to the obtained image; and
    a plurality of OSD information synthesis terminals which synthesizes the image and the first OSD information if meeting specific criteria,
    the OSD information generation camera comprising a housing, the housing comprising:
        an image recorder configured to receive an image signal and generate an image;
        at least one first processor to implement:
            a controller configured to extract basic information for generating the first OSD information from the image; and
            a first OSD information generator configured to generate the first OSD information based on the basic information extracted by the controller; and
        a first communicator configured to individually transmit data of the first OSD information and the image to at least one of the plurality of OSD information synthesis terminals, and to receive data of a second OSD information of the image generated by at least one of the plurality of OSD information synthesis terminals; and
    at least one of the plurality of OSD information synthesis terminals comprising:
        a second communicator configured to individually receive the data of the first OSD information and the image;
        at least one second processor to implement:
            a synthesizer configured to synthesize the image and the first OSD information if meeting the specific criteria; and
        a screen splitter configured to split a screen of a monitor into a plurality of split screens; and
        the monitor configured to display an image synthesized with the first OSD information,
    wherein the specific criteria comprises a number of the plurality of split screens, and
    wherein the synthesizer determines whether to synthesize the image and the first OSD information such that the first OSD information is overlaid within the image, according to the number of the plurality of split screens.

2. The OSD information sharing system of claim 1, wherein at least one of the plurality of OSD information synthesis terminals further comprises
    an input unit configured to receive a user's instruction, and
    wherein the at least one second processor further implements a second OSD information generator configured to generate the second OSD information in response to the user's instruction.

3. The OSD information sharing system of claim 2, wherein the specific criteria comprises user authorization, and
    wherein the at least one second processor further implements a user authorization determiner configured to determine the user authorization so that the synthesizer can determine whether to synthesize the image and the first OSD information according to the determined authorization of the user.

4. The OSD information sharing system of claim 2, wherein a plurality of OSD information generation cameras are provided, and
    if the plurality of OSD information generation cameras take images and transmit the obtained images to the OSD information synthesis terminal,
    the OSD information synthesis terminal displays the received images on the plurality of split screens through the monitor.

5. The OSD information sharing system of claim 1, wherein the at least one first processor further implements
    a dynamic object extractor configured to extract a moving object from the image; and
    a heat map generator configured to aggregate movement trajectories of the extracted object and generate heat map data.

6. The OSD information sharing system of claim 1, wherein the at least one first processor further implements:
    a face detector configured to detect a facial region of a person from the image;
    a face recognizer configured to identify a specific person using the detected facial region; and
    a person determiner configured to determine whether the identified person is a person to be monitored or a person to be protected.

7. The OSD information sharing system of claim 6, wherein the first OSD information generator further comprises a privacy mask generator configured to generate a privacy mask to be applicable to a face of the identified person on the image if the person determiner determines the identified person as the person to be protected.

8. The OSD information sharing system of claim 6, wherein the first OSD information generator further comprises a personal information/OSD converter configured to convert personal information data into the first OSD information displayable around a face of the identified person on the image if the person determiner determines the identified person as the person to be monitored.

9. The OSD information sharing system of claim 1, wherein the at least one first processor further implements:
   a number extractor configured to extract a numerical region of a vehicle from the image; and
   an image generator configured to generate a license plate image of the vehicle into the image.

\* \* \* \* \*